Patented Jan. 30, 1945

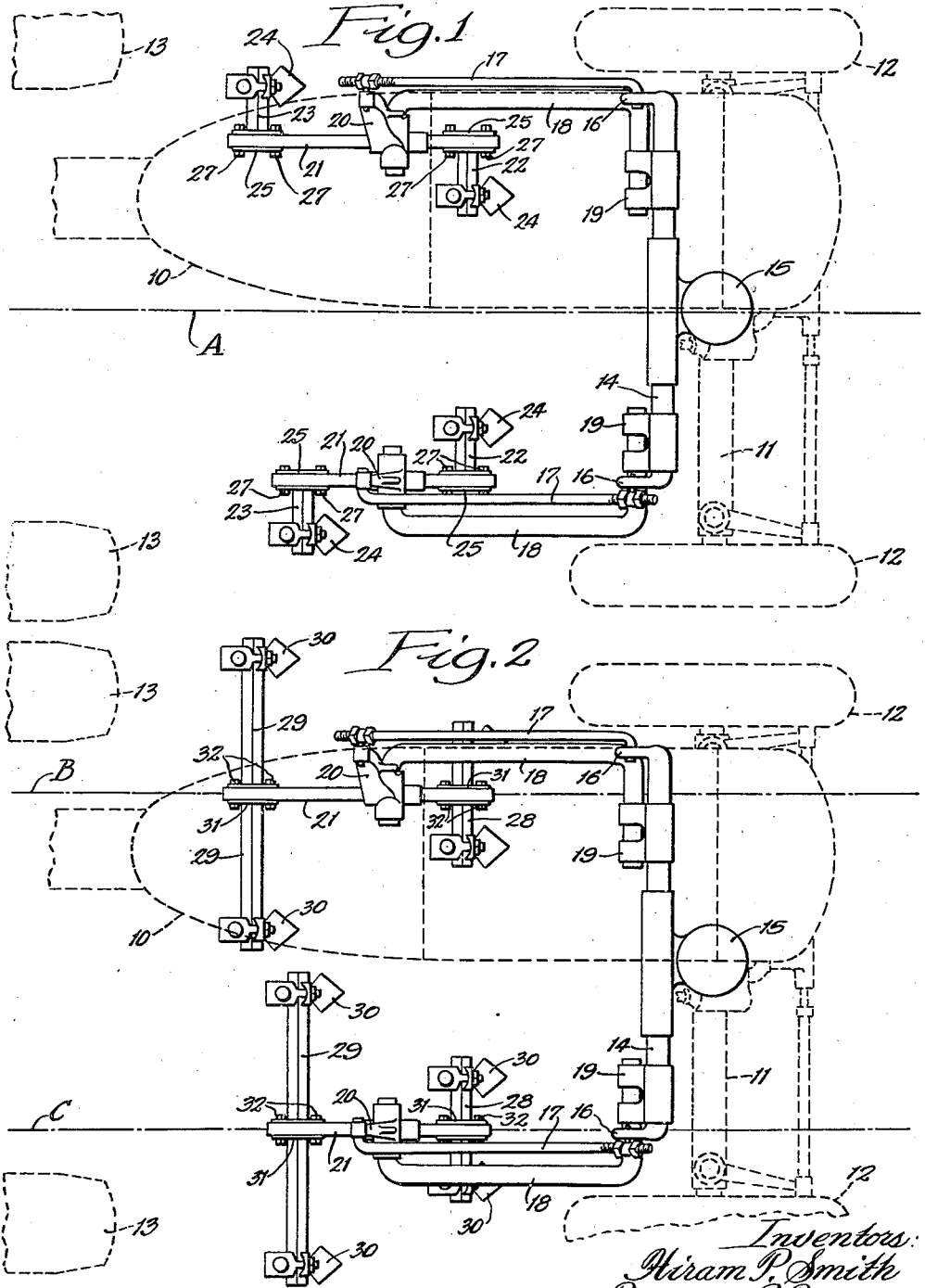

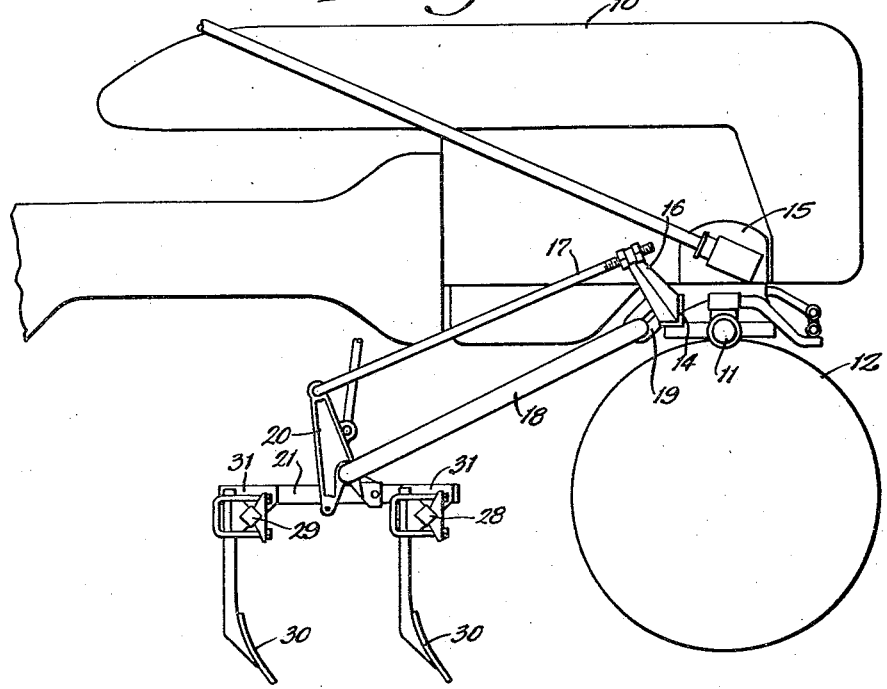
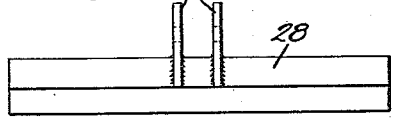
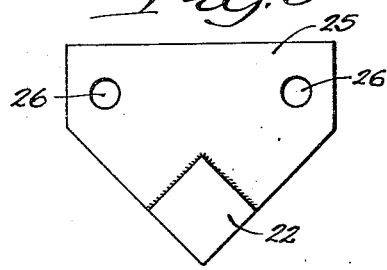

2,368,168

UNITED STATES PATENT OFFICE 2,368,168

AGRICULTURAL IMPLEMENT

Hiram P. Smith and Frederick T. Blaydes, Canton, Ill., assignors to International Harvester Company, a corporation of New Jersey Application March 13, 1943, Serial No. 479,046

1 Claim. (Cl. 97—47)

This invention relates to agricultural implements with particular reference to tractor-mounted implements of the cultivator class. More specifically, the invention relates to a row-crop cultivator which is adaptable to the cultivation of row crops of various widths.

Generally, cultivating implements mounted upon small tractors are adapted for the cultivation of crops having certain row spacings and, when it is desired to cultivate crops having other row spacings, the entire implement must be replaced with one adapted to perform the new function. For example, when it is desired to cultivate a corn crop where rows are spaced in the neighborhood of forty-two inches apart, the tractor straddles a single row and the working tools on each side of the tractor body travel in the row spacing on either side of a row. When a crop such as beans, wherein the row spacing is, say, from twenty-four to twenty-six inches, is to be cultivated, the entire implement must be replaced. Such a procedure, of course, involves a substantial investment in cultivating equipment.

An object of the present invention is to provide inexpensive apparatus for cultivating crops of different row spacings wherein only a small portion of the implement requires replacement.

Another object is the provision of a simple mechanism for converting an implement adapted to work a limited number of crop rows simultaneously to an implement adapted to work a greater number of crop rows simultaneously.

A further object is to provide in an implement adapted to work crops of wide row spacing means for converting the implement to one adapted to work crops of approximately half such wide row spacing. Still another object is to provide, in a tractor-mounted cultivator employing transverse tool bars, means for readily detaching said tool bars and replacing them with tool bars of different lengths to which a different number of working tools may be attached.

These and other objects will become clear from the following detailed description when read in conjunction with the accompanying drawings, wherein:

Figure 1 is a plan view of the forward portion of a tractor, showing laterally spaced cultivating rigs mounted thereon for wide row spacing, the position of the crop row being indicated in dotted lines;

Figure 2 is a plan view similar to Figure 1 but showing the same implement adapted for narrow row spacing, the position of the crop rows being indicated in dotted lines;

Figure 3 is a view in side elevation of the front portion of a tractor, showing the manner in which the cultivating rig is attached thereto;

Figure 4 is an elevation of a tool bar embodying features of the present invention; and Figure 5 is an end elevation of one of the attaching plates or brackets, showing the manner in which it is affixed to the tool bar.

Referring to the drawings, the numeral 10 designates the longitudinally extending, laterally offset body portion of a tractor having a front axle structure 11 and front and rear wheels 12 and 13, respectively. Rearwardly of front axle structure 11, a transversely extending bracing member 14 is suitably mounted, as upon housing 15 for the mechanism by which the front wheels are steered. Bracing member 14 is provided at both ends with an upstanding bracket 16, in which is pivoted the upper link 17 of a pair of rearwardly extending, vertically spaced, parallel links, the lower link 18 being pivotally mounted in a bracket 19 provided on bracing member 14 adjacent its ends. The rearwardly extending ends of links 17 and 18 are pivotally mounted in a vertically extending bracket 20 having affixed to the lower portion thereof a beam 21 of rectangular cross-section extending longitudinally of the tractor and having portions projecting forwardly and rearwardly of the bracket 20.

Referring now particularly to Figure 1, it will be noted that short transverse tool bars 22 and 23, of square cross-section, are mounted at the front and rear ends respectively of beam 21. Each tool bar is provided with working tools 24 removably mounted on the end of the bar and having affixed to the other end thereof, as by welding, laterally spaced, vertically projecting plates 25. These plates are provided with longitudinally spaced openings 26 (see Figure 5) adapted to register with openings in the beam 21 and held in place by bolts 27. The dotted line A indicates the position of the crop row with respect to the working tools. In this position, the implement is adapted for the cultivation of a single widely spaced row, for example, of corn, the two cultivator rigs straddling the row and working the soil on each side thereof.

When it is desired to cultivate a crop, such as means, utilizing narrower row spacing, tool bars 22 and 23 are removed by withdrawing the bolts 27 and are replaced with forward and rearward tool bars 28 and 29 shown in Figures 2 and 3. Tool bars 28 and 29 are longer than bars 22 and 23 and extend transversely and to opposite sides of the beam 21. Bars 28 and 29 have mounted adjacent opposite ends thereof working tools 30 and laterally spaced plates 31, similar in every respect to plates 25, are centrally affixed thereto, as by welding. These plates are spaced a sufficient distance apart to accommodate the beam 21, and a tight connection is provided by bolts 32. The dotted lines B and C in Figure 2 indicate the position of crop rows with respect to the cultivator rigs. With this arrangement, the implement is adapted for the cultivation of two relatively narrower spaced rows, tool bars 28 and 29 on the left side of the tractor straddling row B, and the tool bars on the right side of the tractor straddling row C. Vertical movement of the cultivator rigs to and from ground-working position may be accomplished by conventional lifting mechanism mounted on the tractor and not shown in the drawings.

It is obvious, of course, that various lengths of tool bars and arrangements of working tools may be utilized. Likewise, it may be pointed out that the plates 25 or 31 may, if desired, with slight modification, be affixed to the beam 21 instead of to the tool bar. Further, it should be noted that, for convenience only, the invention has been described and illustrated as applied to the cultivation of a single crop row of wide row spacing and the conversion of the implement to one adapted to cultivate double the number of rows having narrower row spacing. However, it is clear that, with the provision of two or more parallel link arrangements on each side of the tractor, the implement may be adapted to cultivate, for example, two rows of wide row spacing, and may be converted to one adapted to cultivate four rows of narrower row spacing.

Having now described the invention, it should be understood that variations may be made in the arrangement and number of parts without departing from the spirit of the invention or the scope of the appended claim.

What is claimed is:

In a row crop cultivating implement, in combination, a tractor having a longitudinally extending body portion, a supporting frame attached to the tractor for vertical movement, said frame including a pair of vertically spaced generally parallel links pivoted at one end on the tractor and extending longitudinally thereof, an upright bracket pivotally supporting the free ends of said links and having an attaching portion at the base thereof, a longitudinally extending tool beam affixed to said attaching portion and extending forwardly and rearwardly thereof for the attachment of longitudinally spaced transverse tool bars adapted to be replaced by tool bars of greater or lesser length for the cultivating of one or more row crops, said transverse tool bars having a pair of upstanding spaced plates weldingly secured thereto and means for securing said beam therebetween.

HIRAM P. SMITH.
FREDERICK T. BLAYDES.